United States Patent [19]

Fisher et al.

[11] 4,277,809
[45] Jul. 7, 1981

[54] APPARATUS FOR RECORDING MAGNETIC IMPULSES PERPENDICULAR TO THE SURFACE OF A RECORDING MEDIUM

[75] Inventors: Robert D. Fisher, Cupertino; Eric R. Katz, San Jose, both of Calif.

[73] Assignee: Memorex Corporation, Santa Clara, Calif.

[21] Appl. No.: 78,876

[22] Filed: Sep. 26, 1979

[51] Int. Cl.³ ............................ G11B 5/66; G11B 5/02
[52] U.S. Cl. .................................... 360/131; 360/110; 427/131; 428/900; 428/212
[58] Field of Search ............... 360/110, 131, 134, 133, 360/136, 122, 56; 427/131, 132; 428/900, 212

[56] References Cited

U.S. PATENT DOCUMENTS

| | | |
|---|---|---|
| 3,102,048 | 8/1963 | Gran et al. . |
| 3,185,776 | 5/1965 | Camras . |
| 3,219,353 | 11/1965 | Prentky . |
| 3,471,272 | 10/1969 | Wilhelm et al. . |
| 3,582,912 | 6/1971 | Valin et al. . |
| 3,738,818 | 6/1973 | Stone et al. . |
| 3,775,178 | 11/1973 | Perrington et al. . |
| 4,034,410 | 7/1977 | Suzuki et al. . |
| 4,069,360 | 1/1978 | Yanagisawa et al. . |
| 4,075,384 | 2/1978 | Suzuki et al. . |
| 4,091,158 | 5/1978 | Kasuga et al. . |

OTHER PUBLICATIONS

Iwasaki et al., The Magnetic Field Distribution of a Perpendicular Recording Head, Mag.-14, No. 5, IEEE Transactions on Magnetics, Sep. 1978, pp. 436–438.
Iwasaki et al., An Analysis for the Magnetization Mode for High Density Magnetic Recording, vol. Mag.-13, No. 5, IEEE Trans. on Mag., Sep. 1977, pp. 1272–1277.

Primary Examiner—Alfred H. Eddleman

[57] ABSTRACT

Apparatus is disclosed for recording magnetic impulses on a selectively magnetizable medium with such impulses being recorded with their axes of magnetization substantially perpendicular to the surface of the medium utilizing a recording medium having a high magnetic permeability backing layer and an overlying coating of magnetic material having uniaxial anisotropy substantially perpendicular to the surface of the backing layer, and using a unitary magnetic head for both recording and playback with such head positioned adjacent to one side of the recording medium.

9 Claims, 5 Drawing Figures

APPARATUS FOR RECORDING MAGNETIC IMPULSES PERPENDICULAR TO THE SURFACE OF A RECORDING MEDIUM

BACKGROUND OF THE INVENTION

This invention relates to high performance magnetic recording apparatus. More particularly, the invention relates to such apparatus incorporating a particularly advantageous combination of recording medium and recording/playback head for recording magnetic impulses perpendicular to the surface of the recording medium.

Conventional high performance recording devices or subsystems, particularly those used in digital recording, employ a longitudinal recording format in which the magnetization resides in the plane of the recording medium. In order to obtain higher performance, in the form of a greater linear density of recording data, the recording medium is required to be thin, generally less than 20 microinches, and to exhibit a high coercive force, typically greater than 350 oersteds. One of the major limitations to the linear recording density is determined by the in-plane demagnetizing field associated with the recorded bit. This demagnetizing field increases as the bit size decreases, i.e., with increasing linear density, and ultimately approaches a value of $4\pi M_r$ (where $M_r$ is the remanent magnetization) which limits the linear density. Consequently, in order to attain high linear density, the coercive force of the material must be increased and/or the remanence-thickness product of the material decreased. However, the increase in coercive force is restricted by the availability of the recording head field, which is limited by the saturation of the recording head pole pieces when high coercive force materials are used. The performance is also limited by a loss in signal amplitude as the remanence-thickness product is decreased. Thus, when utilizing conventional magnetic recording systems, such as magnetic disc recorders, practical limits of operation are reached as the recorded wavelength decreases (to achieve high linear recording density), since the demagnetizing field would increase to $4\pi M_r$, which would exceed the coercive force of the medium. However, as this condition is approached the media demagnetizes, reducing the amplitude of the magnetic signal.

In order to maintain the demagnetizing field below the coercive force of the medium it has been proposed by several researchers, notably by Iwasaki and Nakamura in their papers and by Suzuki and Akuta in U.S. Pat. No. 4,034,410 to record magnetic bits of data perpendicular to the plane of a recording disc, thereby avoiding the demagnetizing characteristics in the plane. In this perpendicular recording mode the demagnetizing field decreases to zero with decreasing wavelength, due to partial cancellation arising from fields from neighboring recording bit cells. Thus, a thinner medium with a high coercive force is not necessary since the demagnetizing field is not a factor. In addition, the signal-to-noise ratio can be improved, since the apparatus can utilize a thicker medium, which provides a greater signal due to the fact that the remanent magnetic moment per bit is much larger than in longitudinal recording. However, in order to obtain the advantages offered by perpendicular recording, not only must the recording medium exhibit an easy axis perpendicular to the medium plane, but also a magnetic head arrangement must be provided that produces a magnetic field highly perpendicular to the surface of the medium. This has been accomplished in the prior art, such as by Iwasaki et al. and by Suzuki et al., by the use of a recording head having an asymetric structure with the main pole in contact with or in close proximity to the recording medium, as on the top side of a recording disc, to record signals. The other pole of that head, an auxiliary pole, is very large in size compared with the main pole and is positioned on the other side of the recording medium, e.g. below the recording disc. In this prior art the auxiliary pole is energized by a winding around it, and the main pole is magnetized from its pole tip. This arrangement causes the recording magnetic field to extend from the main pole to the auxiliary pole, passing through the recording medium substantially perpendicular to its surface. While this arrangement does provide one form of recording perpendicular to the medium, it possesses several significant disadvantages. One such disadvantage is the requirement of two poles, one on each opposed side of the recording medium, and another disadvantage is that of the requirement of a playback head separate and different from the recording head, a requirement brought on by the inadequate playback efficiency of the recording head at short wavelengths, as described by Iwasaki et al. in IEEE Transactions on Magnetics, Vol. Mag-13, No. 5, pages 1272–1277, September 1977.

SUMMARY OF THE INVENTION

In view of the disadvantages of the prior art recording arrangements, it is an object of this invention to provide apparatus for magnetically recording data at very high linear densities with commercially practicable structures. It is a further object of this invention to provide such apparatus in which magnetic data is recorded with magnetic impulses being aligned with their axes of magnetization substantially perpendicular to the surface of the medium.

To achieve the foregoing, as well as numerous other objects which will become apparent to those skilled in the art, improved magnetic recording apparatus is provided in which a magnetic recording medium is moved relative to magnetic recording heads while signals from an appropriate source are provided to the recording heads, with the improvement comprising the recording medium, which is magnetizable at selected locations on the surface thereof, comprising an extended underlayer of material having magnetic permeability greater than 100 with an overlying coating of magnetic material having uniaxial anisotropy substantially perpendicular to the surface of the under layer, and a unitary magnetic recording/playback head having two closely spaced magnetic poles with both such poles positioned adjacent the outer surface of the recording medium coating overlying one side of the under layer. By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information on the medium in the form of magnetic impulses having their axes of magnetization substantially perpendicular to the surface of the medium.

DETAILED DESCRIPTION OF A PREFERRED EMBODIMENT

Figure 1:
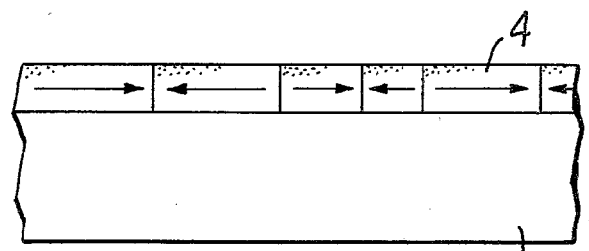
FIG. 1 is a schematic representation in section of a recording medium utilizing a longitudinal recording format.
Figure 3:
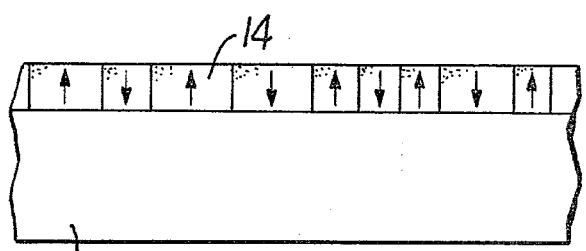
FIG. 3 is a magnetic recording medium utilizing the perpendicular recording format of the present invention.
Figure 2:
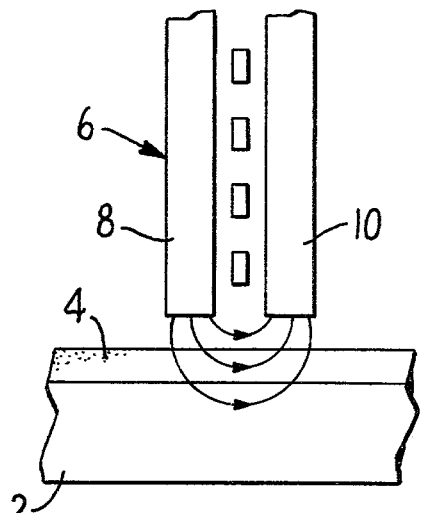
FIG. 2 is a schematic representation of a conventional magnetic recording head and recording medium combination for longitudinal recording as in FIG. 1.
Figure 4:
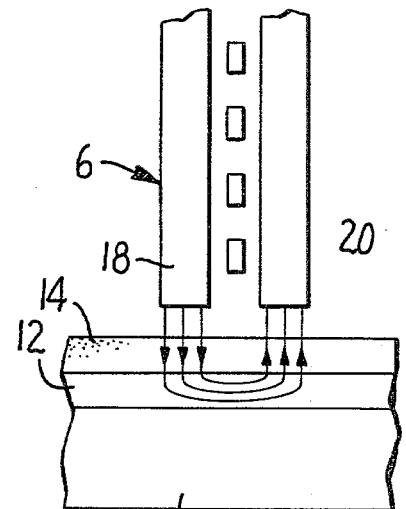
FIG. 4 is a schematic representation of the improved recording apparatus of the present invention illustrating a recording head and recording medium combination for perpendicular recording on one side
Figure 5:
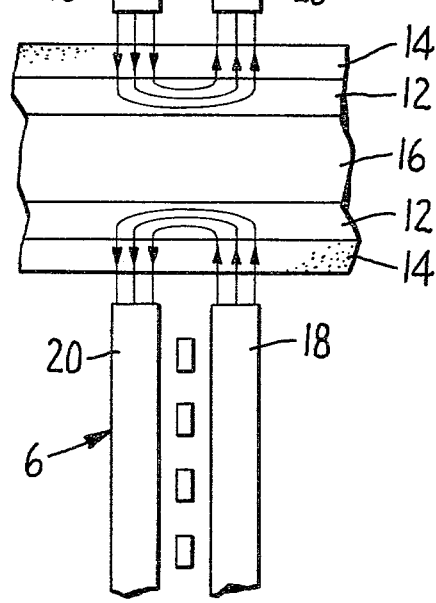
FIG. 5 is a schematic representation of the improved recording apparatus of the present invention, similar to that of FIG. 4, but adapted for recording separately on both sides of the medium.

A preferred embodiment of the present invention will be described in detail below, illustrating and explaining the manner in which the improved structure provides for perpendicular recording with a unitary record/playback head. However, to illustrate certain distinctions between conventional recording apparatus and the improved apparatus of the invention, corresponding structures are illustrated schematically. FIGS. 1 and 3 illustrate, for purposes of explanation, the magnetic alignment of recorded data in conventional, in-plane recording (FIG. 1) and with the perpendicular recording (FIG. 3) of this invention. FIG. 2 illustrates the functional cooperation between a conventional recording head, such as a thin film head, and a conventional recording substrate. FIGS. 4 and 5 illustrate the functional relationship between recording/playback heads, such as conventional thin film heads, and the recording medium of the present invention. It is to be understood that each of the recording arrangements of FIGS. 3 through 5 incorporates the conventional components of a magnetic recording system, including not only the recording media and recording heads but also apparatus for moving the media relative to the heads and the appropriate electronic circuitry for both providing signals to the heads and for processing signals received from the heads. Such apparatus could, for example, be that found in a magnetic tape drive and controller, or, preferably, that associated with a magnetic disc recording system, for example, a Memorex Model 3650 system. Since these additional, relatively conventional components are well known in the art, they are incorporated by reference and are not illustrated and described in detail.

FIG. 1 illustrates, schematically, a conventional recording medium such as used with conventional magnetic disc recording systems, e.g., the Memorex Model 3650. This medium is utilized for recording magnetic impulses in or parallel to the plane of the medium itself. The recording medium, a recording disc in this instance, comprises basically a supporting substrate 2 of a suitable non-magnetic material such as aluminum, with an overlying coating 4 of a suitable and conventional magnetic oxide dispersed in an appropriate resin binder.

In FIG. 2 is shown the operative relationship between a conventional recording/playback head 6, which may preferably be a thin film head such as is known to those skilled in the art, and a conventional recording medium, such as that of FIG. 1.

FIG. 3 illustrates schematically the orientation of magnetic impulses substantially perpendicular to the surface of the recording medium, generally in the manner provided for by the present invention. For such perpendicular recording the medium includes an under layer 12 of a material having a high magnetic permeability, preferably greater than 100, which suitably may be either a ferromagnetic or ferrimagnetic material, such as a permalloy material, iron, or the like. This under layer 12 is then provided with an overlying coating 14 of magnetic material having a uniaxial anisotropy substantially perpendicular to the surface of the under layer 12.

Preferred embodiments of the recording medium, operating in conjunction with suitable record/playback magnetic heads, are illustrated in FIGS. 4 and 5. The recording medium illustrated in FIG. 4 includes both the high permeability under layer 12 and the overlying coating 14 of magnetic material described with respect to FIG. 3 above. However, both of these layers 12 and 14 are shown applied to a suitable substrate 16, which may desirably be an aluminum disc, although other material such as glass or synthetic resins may also be used. FIG. 5 illustrates a similar structure in which the substrate 16 carries the layers 12 and 14 on each of its two opposed sides, with suitable recording heads 6 positioned adjacent the outer surface of the magnetic coating 14 on each side of the medium.

The recording heads 6 used with each of the embodiments illustrated may suitably be a thin film head of the type known to those skilled in the art and having, suitably, a gap length of about 20 micro-inches, a pole thickness of about 200 microinches, a permeability preferably greater than 1,000 and carrying about 10 turns of winding. Such a recording head may desirably have a throat height less than about 100 micro-inches and be configured to fly on a film of air at a height of about 5 to 10 micro-inches above the recording medium surface, utilizing a current of 50 to 100 milliamp for the writing function. Such a head may be mounted in a conventional manner, for example, bonded to the center rail of the head slider in recording apparatus generally similar to the Memorex Model 3650 disc drive.

The magnetic layer 14 of the recording medium must exhibit an anisotropy such that the anisotropy perpendicular to the medium is sufficient to allow the magnetization to remain perpendicular. Cobalt has a large magneto-crystalline anisotropy energy and may be used with additions of soluble non-magnetic elements to form alloys, such as cobalt-chromium, having the desired reduced saturation magnetization values. However, the hexagonal close-packed crystalline structure must be maintained with the crystal orientation such that the "c" axis is perpendicular to the surface of the medium. A suitable example is a cobalt-chromium film with 15% chromium and the thickness of approximately 1 micron (10,000 angstroms). Other similar materials, including cobalt-nickel alloys, may be used as well, preferably applied by RF sputtering. For most satisfactory performance it has been found most desirable to maintain the coercive force of this magnetic layer 14 between 300 and 1,000 oersteds.

High permeability under layer 12, which extends between the substrate 16 and each magnetic layer 14, may be any material exhibiting a magnetic permeability in excess of about 100 in order to provide for the desired perpendicularity of the magnetic field through the recording layer when the record/playback head 6 is energized. The thickness of this high permeability under layer is not critical but should be sufficient to avoid saturation by the magnetic writing field and therefore should be equivalent to the thickness of the record/playback head poles, suitably in the range of 0.2 to 0.5 mils. The composition of this under layer 12 is not critical and may include nickel, iron or iron-cobalt alloys with the desired permeability. A typical composition may be 81% nickel, 19% iron, which is isotropic and has a coercive force less than 5 oersteds. These characteristics will ensure that the material is sufficiently permeable over the write field utilized during the recording process.

By the use of the present invention significant advantages may be realized over both the conventional recording techniques and over the perpendicular recording techniques disclosed by Iwasaki et al. and Suzuki et al. With conventional recording techniques, as schematically illustrated in FIG. 2, the fringing magnetic fields between the pole tips 8 and 10 of a conventional recording head cause the magnetic impulses to be oriented with their axes generally parallel to the surface of the medium, thus limiting the performance capability of the recording system as described above. With the perpendicular recording techniques of Iwasaki et al. and Suzuki et al., the higher recording bit density of the perpendicular recording technique may be obtained. However, since those disclosed techniques function by applying a magnetic field perpendicular to the surface of the recording medium all the way through the medium, from the main pole tip on one side of the disc to the auxiliary pole on the other side of the disc, this not only precludes simultaneous recording of different signals on corresponding portions of opposite sides of the medium, but also requires a separate playback head, since the playback efficiency of the record head at short wavelengths or high linear bit densities, is inadequate.

By the use of a high permeability under layer 12 beneath the recording layer 14 of the medium, the fringing field from the thin film head 6 for writing is modified by this high permeability layer such that the flux entering the recording medium and passing through the magnetic recording layer 14 is perpendicular to the surface of the medium. This is due to the fact that magnetic flux enters or leaves a high permeability surface perpendicular to that surface. The fringing magnetic field between the pole tips of the recording/playback head 6 in FIGS. 4 and 5 is generally that indicated schematically by the arrows extending between the pole tips 18 and 20 of the heads 6. Thus, by the practice of this invention the magnetic recording field need extend only through the magnetic recording layer 14 and into the high permeability under layer 12, and not all the way through the recording medium and its substrate as required by Iwasaki et al. and Suzuki et al. Thus may be realized the major advantages of being able to record simultaneously two different signals on corresponding portions of opposite sides of a recording medium, as illustrated in FIG. 5, and, the use of a unitary magnetic recording/playback head having two closely spaced magnetic poles with both of those poles positioned adjacent the outer surface of the overlying coating on each side of the recording medium. By this ability to use unitary record/playback heads, and particularly the thin film heads, advantage may be taken of the superior permeability of those thin film heads as compared to conventional ferrite heads. Thus, in comparison to the structure proposed by Iwasaki et al. or Suzuki et al., the apparatus of the present invention may provide for substantially greater frequency response as well as simplified apparatus, since the present invention provides for conversion of the longitudinal magnetic writing field from a conventional head to a perpendicular field by the high permeability under layer, and thus permits the same head to be utilized for both recording and playback.

While the foregoing describes preferred embodiments of the magnetic recording apparatus of the present invention, it is to be understood that the foregoing description is intended only to be illustrative of the principles of the invention and is not to be considered limitative thereof. Accordingly, the scope of the invention is to be limited solely by the claims appended hereto.

What is claimed is:

1. In apparatus for recording magnetic impulses on a selectively magnetizable medium, which apparatus includes a recording medium, at least one magnetic recording and playback head, means for moving the recording medium relative to the recording head and means for supplying signals to the recording head for recording upon the medium, the improvement comprising said recording medium comprising an extended under layer of a material having a magnetic permeability greater than 100, with an overlying coating of magnetic material having uniaxial anisotropy substantially perpendicular to the surface of said under layer, and said magnetic recording and playback head being a unitary recording/playback head having two closely spaced magnetic poles with both said poles positioned adjacent the outer surface of said recording medium overlying coating on one side of said medium, whereby the magnetic lines of flux extending between the poles of the head loop into and out of the outer surface of the recording medium overlying coating with the under layer of the recording medium causing the lines of flux to pass through the coating in a direction generally perpendicular to the surface of the medium to record information on the recording medium in the form of magnetic impulses having their axes of magnetization substantially perpendicular to the surface of the medium.

2. The recording apparatus of claim 1 wherein said recording medium includes said magnetic coating overlying both opposed sides of said under layer, and wherein said apparatus includes at least one said magnetic recording/playback head positioned adjacent the outer surface of said recording medium coating on each side of said recording medium, whereby magnetic impulses may be recorded on both opposed sides of the recording medium.

3. The recording apparatus of claim 2 wherein said recording medium comprises an extended, substantially nonmagnetic substrate having said under layer overlying the two opposed sides of said substrate and said magnetic material coating overlying both said backing layers.

4. The recording apparatus of claim 3 wherein said substrate comprises an aluminum disc.

5. The recording apparatus of claim 1, 2, or 3 wherein said recording medium under layer comprises a ferromagnetic material.

6. The recording apparatus of claim 1, 2, or 3 wherein said recording medium backing under layer comprises a ferrimagnetic material.

7. The recording apparatus of claim 1, 2, or 3 wherein said backing layer comprises permalloy material.

8. The recording apparatus of claim 1 wherein said magnetic head comprises a ferrite air-gap head.

9. The recording apparatus of claim 1 wherein said magnetic head comprises a thin film head.

* * * * *